(12) United States Patent
Braun et al.

(10) Patent No.: US 11,607,690 B2
(45) Date of Patent: Mar. 21, 2023

(54) SAMPLE VESSEL CAPPING APPLICATOR OR APPLICATOR SYSTEM

(71) Applicant: AIM LAB AUTOMATION TECHNOLOGIES PTY LTD, Virgina (AU)

(72) Inventors: Damien Braun, Virginia (AU); Francis Harvey, Virginia (AU); David Muir-McCarey, Virginia (AU); Robert Fisher, Virginia (AU); Sandy Sherry, Virginia (AU); Zisui Yao, Virginia (AU); Rainer Novy, Virginia (AU); Matthew Grant, Virginia (AU); Peter Dalman, Virginia (AU); Thomas Knight, Virginia (AU)

(73) Assignee: AIM LAB AUTOMATION TECHNOLOGIES PTY LTD, Virginia (AU)

( * ) Notice: Subject to any disclaimer, the term of this patent is extended or adjusted under 35 U.S.C. 154(b) by 243 days.

(21) Appl. No.: 16/650,750

(22) PCT Filed: Aug. 29, 2018

(86) PCT No.: PCT/AU2018/050928
§ 371 (c)(1),
(2) Date: Mar. 25, 2020

(87) PCT Pub. No.: WO2019/060945
PCT Pub. Date: Apr. 4, 2019

(65) Prior Publication Data
US 2020/0269236 A1 Aug. 27, 2020

Related U.S. Application Data
(60) Provisional application No. 62/577,921, filed on Oct. 27, 2017.

(30) Foreign Application Priority Data

Sep. 26, 2017 (AU) .............................. 2017903895

(51) Int. Cl.
*B01L 3/00* (2006.01)
*A61J 1/14* (2023.01)
(Continued)

(52) U.S. Cl.
CPC ......... *B01L 3/50825* (2013.01); *A61J 1/1412* (2013.01); *A61J 1/16* (2013.01);
(Continued)

(58) Field of Classification Search
CPC ............ B01L 3/50825; B01L 3/50853; B01L 2200/0689; B01L 2300/044;
(Continued)

(56) References Cited

U.S. PATENT DOCUMENTS 5,985,214 A * 11/1999 Stylli ....................... B01J 19/00
422/63
6,408,595 B1 6/2002 Friedman
(Continued)

OTHER PUBLICATIONS

International Search Report dated Dec. 12, 2018 for or corresponding International Patent Application PCT/AU2018/050928 filed on Aug. 29, 2018.
(Continued)

*Primary Examiner* — Jill A Warden
*Assistant Examiner* — Dwayne K Handy
(74) *Attorney, Agent, or Firm* — David D. Brush; Westman, Champlin & Koehler, P.A.

(57) ABSTRACT

An applicator or applicator system used for handling samples in an analytical laboratory setting. In particular, the invention the applicator or applicator system is capable of capping an analytical sample tube by applying a capping
(Continued)

material to an opening of an analytical sample vessel, the applicator or applicator system including g a dispenser configured to dispense a substantially continuous length of a capping material, such that a region of the substantially continuous length of capping material is located on or about an opening of an analytical sample vessel held in a predetermined orientation.

19 Claims, 9 Drawing Sheets

(51) Int. Cl.
    *A61J 1/16*           (2023.01)
    *B65B 7/16*           (2006.01)

(52) U.S. Cl.
    CPC .......... *B01L 3/50853* (2013.01); *B65B 7/164* (2013.01); *B65B 7/165* (2013.01); *B01L 2200/0689* (2013.01); *B01L 2200/141* (2013.01); *B01L 2300/044* (2013.01)

(58) Field of Classification Search
    CPC ... G01N 2035/0405; G01N 2035/0415; G01N 2035/0418
    See application file for complete search history.

(56) References Cited

U.S. PATENT DOCUMENTS

| | | |
|---|---|---|
| 2002/0021986 A1 | 2/2002 | McCall et al. |
| 2004/0065054 A1* | 4/2004 | Thomas Wittibslager ................. B65B 57/16 53/449 |
| 2005/0226780 A1 | 10/2005 | Sandell et al. |
| 2012/0058516 A1 | 3/2012 | Collins |

OTHER PUBLICATIONS

Written Opinion Report dated Dec. 12, 2018 for corresponding International Patent Application PCT/AU2018/050928 filed Aug. 29, 2018.

\* cited by examiner

SAMPLE VESSEL CAPPING APPLICATOR OR APPLICATOR SYSTEM

The present application is a Section 371 National Stage Application of International Application No. PCT/AU2018/050928, filed Aug. 29, 2018, which is incorporated by reference in its entirety and published as WO 2019/060945 A1 on Apr. 4, 2019, in English, which claims priority from U.S. provisional patent application 62/577,921, filed Oct. 27, 2017 and Australian Provisional Patent Application 2017903895, filed Sep. 26, 2017, which are incorporated herein by reference in their entireties.

FIELD OF THE INVENTION

The present invention is directed generally to an applicator or applicator system used for handling samples in an analytical laboratory setting. In particular, the invention is directed to an applicator or applicator system capable of capping an analytical sample tube.

BACKGROUND TO THE INVENTION

For many reasons, a laboratory may be required to retest a sample sent to it for analysis. For example, the result of an initial analysis may be invalidated by an out-of-range control or a decision has been taken to perform a different analysis on the same sample. Given the possibility that a sample may be required for further testing, it is common for a sample tube to be capped soon after an initial aliquot is withdrawn directly for testing or for transfer to another tube.

Sample tubes containing already-analysed samples, but without the original seal, plug or screw cap, previously removed to enable withdrawal of a sample through a sampling needle, are collected in support or storage racks which are packed and placed in dedicated cold storage compartments to preserve the samples for later testing.

The capping of sample tubes may also be required before any analysis is performed. For example, a sample may be divided into two or more "daughter" tubes to allow for multiple testing. The daughter tubes may be immediately used for analysis, or alternatively are placed in support racks and maintained in cold storage One reason for capping tubes is to protect the contents and prevent cross-contamination. In high throughput analytical laboratories, sample tubes are typically stored in racks such that the opening of one tube is proximal to another. There is the possibility that during transport liquid from one sample tube may tip or splash into an adjacent tube. A cap will further prevent contamination of the laboratory environment given the propensity for biological samples to form aerosols and be inhaled by laboratory personnel.

In the prior art, various plastic wraps, films and other precarious coverings have been applied over the opening of a sample tube so as to contain the contents. However, the risk of spillage or leaks remains high, as is the risk of personnel being contaminated by sometimes dangerously infectious samples.

Furthermore, sample tubes that have already been uncapped and/or tested in a laboratory are often moved or transported around the laboratory between departments or to other laboratories.

During transport, tubes not uncommonly become oriented away from the vertical, leading to loss of some or all of the sample. This may require the phlebotomist to arrange another sample to be taken from the patient. For this reason as well, it is desirable to contain the contents of a sample tube.

As a more secure alternative, a plastic cap may be screwed onto the tube after the sample is withdrawn. An example this approach is the Univo Screw Cap Recapper SR008 (Micronic, Inc USA) which is an applicator or applicator system capable of holding eight screw caps side-by-side in a linear arrangement. The caps are applied to the opening of a series of tubes in identical linear arrangement and the applicator or applicator system is actuated so as to cause a motor to spin and screw each cap onto its corresponding tube. This approach is costly, requires considerable dexterity by the operator, and moreover typically requires the cap to be removed to effect further sampling.

Sample vessels are also used in non-clinical high throughput settings. In the analysis of environmental and industrial materials, vessels are routinely used to collect and store samples. As for clinical samples, there is often a need to cap a sample vessel with similar problems referred to supra presenting.

It is an aspect of the present invention to overcome or ameliorate a problem of the prior art by providing an applicator or applicator system which is capable of capping an analytical sample tube or other sample vessel in a simple, rapid and cost efficient manner. Moreover, the cap provided by the applicator or applicator system may be penetrable by a sampling needle to facilitate resampling where necessary. More commonly, the cap may be completely removed.

The discussion of documents, acts, materials, devices, articles and the like is included in this specification solely for the purpose of providing a context for the present invention. It is not suggested or represented that any or all of these matters formed part of the prior art base or were common general knowledge in the field relevant to the present invention as it existed before the priority date of each claim of this application.

SUMMARY OF THE INVENTION

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" or "in some embodiments" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly it should be appreciated that the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some but not other features included in other embodiments, combinations of features of different embodiments are meant to be within the scope of the invention, and from different embodiments, as would be understood by those in the art.

In the claims and the description herein, any one of the terms "comprising", "comprised of" or "which comprises" is an open term that means including at least the elements/features that follow, but not excluding others. Thus, the term comprising, when used in the claims, should not be interpreted as being limitative to the means or elements or steps listed thereafter. For example, the scope of the expression a method comprising step A and step B should not be limited to methods consisting only of methods A and B. Any one of the terms "including" or "which includes" or "that includes" as used herein is also an open term that also means including at least the elements/features that follow the term, but not excluding others. Thus, "including" is synonymous with and means "comprising".

Furthermore, it is not represented that all embodiments of the invention disclosed herein have all advantages described. Some embodiments may have only a single advantage, and indeed some may have no advantage merely being a useful alternative to the prior art.

In a first aspect, but not necessarily the broadest aspect, the present invention provides an applicator or applicator system for applying a capping material to an opening of an analytical sample vessel, the applicator or applicator system comprising: a dispenser configured to dispense a substantially continuous length of a capping material, such that a region of the substantially continuous length of capping material is located on or about an opening of an analytical sample vessel held in a predetermined orientation. The applicator or applicator system is typically configured such that location of the region of capping material on or about an opening of an analytical sample vessel is typically performed before cutting the continuous length of capping material to form a discrete cap.

Applicant proposes that the applicator or applicator system of the present invention provides significant advantage in the field on analytical sample handling. The use of a substantially continuous length of a capping material to seal or otherwise close the opening of a sample vessel allows for the rapid and effective treatment of many vessels in a cost efficient manner. Prior art methods rely on a sealing film or the like being pre-cut before application to a tube, with the operator actively applying the cut film or the like to the tube opening. By contrast, the present invention provides for the use of a capping material which is cut only when it is positioned on or about the sample tube opening. The applicator or applicator system may be configured to use a long roll of capping material, such a roll being cost-effective and easily transportable without damage to the material.

The capping material may be any deformable material that is capable of closing over the opening of a sample vessel either on its own (for example, by crimping about the opening) or in combination with an adhesive, sealant or other means.

Preferably, the capping material is a metal foil. Foil is robust, yet easily pierceable by the needle of a sampling apparatus. Other suitable materials include polymeric films which may function so as to cling about a sample vessel tube opening.

In one embodiment, the applicator or applicator system comprises a holder configured to hold an analytical sample vessel in a predetermined orientation, the holder and dispenser in relative spatial arrangement, or configured to be movable into relative spatial arrangement such that, in use, a region of a capping material dispensed by the dispenser is positionable on or about an opening of an analytical sample vessel held by the holder.

The holder may be integral with the capping material dispenser to form a self-contained applicator, as shown in the preferred embodiment of the drawings. Such embodiments will typically be used for ad hoc low volume capping applications.

More typically, the application of capping material will occur in the context of a high-throughput sample handling system, such systems generally comprising sample vessel transport means. In such embodiments, the holder of the present invention may be provided by the sample handling system. Thus, the holder in combination with the dispenser results in an applicator system. The applicator system may be configured such that the sample handling system positions and holds the sample vessel opening below a region of capping material in the course of applying the capping material on or about the vessel opening.

Generally, an analysis laboratory will have an existing sample handling system in which case the present applicator is configured so as to integrate (structurally and functionally) with the existing system. Functional integration may be by way of a control system (software and/or hardware mediated) configured to recognise when a sample vessel is in position and then commencing the capping process once the vessel is in fact in position.

The present applicator may be configured to cap a single sample vessel held by the sample handling system, or multiple vessels where the sample handling system handles vessels en bloc.

In one embodiment of the first aspect (and irrespective of whether the holder is integral with or separate to the dispenser), the holder is configured to hold an analytical sample vessel having an opening in an orientation such that, when uncapped, contents of the analytical sample vessel remain therein.

In one embodiment of the first aspect (and irrespective of whether the holder is integral with or separate to the dispenser), the holder is configured to hold an analytical sample vessel having an opening in an orientation such that the opening faces substantially upwardly. Typically, the vessel contains a liquid sample, and so during handling is generally maintained substantially vertically.

In one embodiment of the first aspect (and irrespective of whether the holder is integral with or separate to the dispenser), the holder is configured to releasably engage with a base region and/or a side of an analytical sample vessel, or a support for one or a plurality of sample vessels. As will be appreciated, the sample vessel may be moved in the course of a workflow between a storage rack, a capping applicator or applicator system, and an analytical apparatus such that holders capable of easily and quickly allowing for engagement and disengagement are preferred in the context of the present applicator or applicator system.

In one embodiment of the first aspect, the analytical sample vessel is a vessel of diameter or width of between about 5 mm and 20 mm, although may be of diameter of greater than about 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm or 30 mm, and in some embodiments is less than about 1 mm, 2 mm, 3 mm, 4 mm, 5 mm, 6 mm, 7 mm, 8 mm, 9 mm, 10 mm, 11 mm, 12 mm, 13 mm, 14 mm, 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, or 200 mm.

The height of the vessel may be between about 50 mm and 10 mm, although in some embodiments may be greater than about 10 mm, 20 mm, 30 mm, 40 mm, 40 mm, 50 mm, 60 mm, 70 mm, 80 mm, 90 mm, 100 mm, 110 mm, 120 mm, 130 mm, 140 mm, 150 mm, 160 mm, 170 mm, 180 mm, 190 mm, or 200 mm.

The vessel is generally a circular tube, but may have a cross-sectional geometry selected from the group consisting of an oval, or a square, or a triangle or any other polygon.

The present invention is particularly applicable to analytical sample vessels of the type used for the collection of clinical specimens (of medical or veterinary origin) such as a vessel used to collect or hold or process a urine specimen (or a derivative or urine such as a centrifuged derivative) or a blood specimen (or a derivative such as a plasma or a serum preparation). Highly preferred vessels include dedicated vessels such as a Vacutainer™ (blood collection tube) or other similar tubes having a removable or pierceable enclosure, or a urinalysis tube (such as a 12 mL volume tube of dimensions 16×93 mm).

The present invention is contemplated to have utility also in the capping of sample vessels used in non-clinical analyses in the fields such as mining, agricultural and environmental sciences. Such vessels may be of substantially greater volume than clinical sample vessels. For example, some vessels may have a volume of about 1 litre, and a height of about 200 mm.

In one embodiment of the first aspect, the analytical sample vessel is a multiwell (microtiter) plate. These plates may have a height of less than about 10 mm. It will be appreciated that capping material of greater width will be required to span and close over the upper face of a multiwall plate. In this context, the collective openings of all wells of the plate is considered as "the opening" for the purposes of describing the present invention.

In one embodiment of the first aspect, the support is a tube rack, of the type well known and used in analytical laboratories to unify multiple tubes to assist in handling.

While the present invention is described mainly be reference to the capping of a single tube, the principles extends to the capping of racked tubes (in which case a row of tubes may be capped by a row of appropriately spaced crimping heads), and even multiwall plates of the kinds used in serology (where the foil will be broader that that used for single tubes, so as to cover the width of an entire plate, and the crimping head will be relatively large).

The preferred embodiments more fully described herein are directed to the capping of a stationary tube (which is moved by hand), in one embodiment of the first aspect the holder is configured to move an analytical sample vessel from a first position in which the applicator or applicator system is incapable of capping an analytical sample vessel with a capping material dispensed by the dispenser, to a second position in which the applicator or applicator system is capable of capping the analytical sample vessel with the capping material dispensed by the dispenser.

In one embodiment of the first aspect, the applicator or applicator system comprises a holder locking means configured to lock the holder in a position in which the applicator or applicator system is capable of capping an analytical sample vessel with a capping material dispensed by the dispenser.

In one embodiment of the first aspect, the applicator or applicator system comprises a capping detector configured to detect or infer when an analytical sample vessel is in a position in which the applicator or applicator system is capable of capping it has been capped with a capping material dispensed by the dispenser, wherein the holder locking means is configured to unlock when the capping detector detects or infers that the analytical sample vessel has been capped.

In one embodiment of the first aspect, the applicator or applicator system comprises the applicator or applicator system and/or dispenser is/are configured to feed a region of a substantially continuous length of a capping material toward an opening of an analytical sample vessel held by the holder in a position in which the applicator or applicator system is capable of capping the analytical sample vessel with a capping material dispensed by the dispenser.

In one embodiment of the first aspect, the dispenser is configured to releasably engage with a roll configured to hold and release a substantially continuous length of a capping material.

In one embodiment of the first aspect, the dispenser comprises a rotatable or rotating member configured to releasably engage with the roll configured to hold a substantially continuous length of a capping material.

In one embodiment of the first aspect, the roll configured to hold a substantially continuous length of a capping material is configured to hold a capping material of width about 10 mm to about 100 mm Widths of between about 10 mm and about 30 mm will be useful for many clinical pathology specimen tubes, while widths of between about 10 mm to about 60 mm will be useful for capping urine pots. Widths useful for microtitre plates will typically fall within the range of from about 80 mm to about 200 mm.

In some embodiments, multiple capping material rolls are incorporated into the applicator or applicator system to allow for the simultaneous capping of groups of vessels (such as all tubes contained in a rack). For example, several rolls may be used to dispense relatively narrow parallel lengths of capping material with each length being used to cap a single column of tubes. In other embodiments, the invention is configured such that a single (relatively wide) length of capping material is used to close over all vessels in a rack. In embodiments configured to process grouped vessels, it will be appreciated that the capping material may not contact the lateral surfaces of vessels in the centre of the group—these tubes may only have capping material contacting the lip of the opening. Tubes about the edge of the group may have capping material contacting the lip and the outward-facing lateral surface of the tubes.

In one embodiment of the first aspect, the roll configured to hold a substantially continuous length of a capping material is configured to hold a capping material of length greater than about 10 cm, 20 cm, 30 cm, 40 cm, 50 cm, 60 cm, 70 cm, 80 cm, 90 cm, 1 m, 2 m, 3 m, 4 m, 5 m, 6 m, 7 m, 8 m, 9 m, 10 m, 50 m, 100 m, 200 m, 300 m, 400 m, 500 m, 600 m, 700 m, 800 m, 900 m, or 1000 m.

In one embodiment of the first aspect, the applicator or applicator system comprises a capping material transport system configured to transport a region of a substantially continuous capping material dispensed by the dispenser from the dispenser and to a position in which the applicator or applicator system is capable of capping an analytical sample vessel held by the holder.

In one embodiment of the first aspect, the capping material transport system comprises one or more of: a motor driven roller, a guide roller, and a pinch roller.

In one embodiment of the first aspect, the capping material transport system comprises one or more guides configured to guide a region of capping material transported by the capping material transport system.

In one embodiment of the first aspect, the capping material transport system comprises one or more tracks configured to support and/or guide the capping material.

In one embodiment of the first aspect, the applicator or applicator system comprises a capping material locking means configured to lock a capping material in a position in which the applicator or applicator system is capable of capping an analytical sample vessel with the capping material. As the present capping material is substantially continuous, a portion of capping material is severed at some time so as to form a capping material portion which forms the cap on the vessel. The act of severing may require the foil to be immobilised, hence the provision of a capping material locking means in some embodiments. In the preferred embodiment disclosed infra, the vessel forms part of a locking means by forming one half of a clamping mechanism which locks the capping material in place during cutting. Other embodiments of the invention may comprise a dedicated locking means which is not dependent on the involvement of the vessel.

In one embodiment of the first aspect, the capping material locking means is configured to unlock when the capping detector detects or infers that the analytical sample vessel has been capped.

In one embodiment of the first aspect, the capping material transport system and/or capping material locking means is/are configured to transport and/or lock a capping material having a thickness less than about 200 μm, or 100 μm, or 90 μm, or 80 μm, or 70 μm, or 60 μm, or 50 μm, or 40 μm, or 30 μm, or 20 μm, or 10 μm, without irreversibly damaging the capping material.

In one embodiment of the first aspect, the applicator or applicator system comprises a capping material urging means configured to urge a capping material dispensed by the dispenser onto and/or about an opening of an analytical sample vessel.

In one embodiment of the first aspect, the applicator or applicator system comprises a capping material crimping means configured to crimp a capping material dispensed by the dispenser snugly onto the analytical sample vessel.

In one embodiment of the first aspect, the applicator or applicator system comprises a capping material cutting means configured to cut free a terminal portion of a capping material dispensed by the dispenser.

In one embodiment of the first aspect, the capping material cutting means is disposed downstream from the capping material urging means and the dispenser.

In a second aspect, the present invention provides a substantially continuous capping material capable of capping an analytical sample vessel, the capping material being elongate and configured for use in the applicator or applicator system according to any embodiment of the first aspect.

In one embodiment of the second aspect, the substantially continuous capping material has a length of greater than about 10 cm, 20 cm, 30 cm, 40 cm, 50 cm, 60 cm, 70 cm, 80 cm, 90 cm, 1 m, 2 m, 3 m, 4 m, 5 m, 6 m, 7 m, 8 m, 9 m, 10 m, 50 m, 100 m, 200 m, 300 m, 400 m, 500 m, 600 m, 700 m, 800 m, 900 m, or 1000 m.

In one embodiment of the second aspect, the substantially continuous capping material has a width of at least about 10 mm, or 20 mm, 30 mm, or 40 mm, or 50 mm, or 60 mm or 70 mm, or 80 mm or 90 mm, or 100 mm, or 150 mm or 200 mm. In one embodiment of the second aspect, the substantially continuous capping material has a thickness less than about 200 μm, 100 μm, or 90 μm, or 80 μm, or 70 μm, or 60 μm, or 50 μm, or 40 μm, or 30 μm, or 20 μm, or 10 μm.

In one embodiment of the second aspect, the substantially continuous capping material is in the form of a roll.

In a third aspect, the present invention provides a system for applying a capping material to an opening of an analytical sample vessel, the system comprising the applicator or applicator system of any embodiment of the first aspect, and the substantially continuous capping material of any embodiment of the second aspect.

In one embodiment of the third aspect, the dispenser is loaded with the substantially continuous capping material.

In a fourth aspect there is provided by the present invention a method for capping an analytical sample tube, the method comprising the steps of: providing an analytical sample vessel having an opening and a sample disposed therein, by automated applicator or applicator system-assisted means disposing a region of a substantially continuous capping material onto and/or about the opening of the analytical sample vessel by automated applicator or applicator system-assisted means urging the region of a substantially continuous capping material onto and/or about the opening of the analytical sample vessel so as to cap the analytical sample vessel, and by automated applicator or applicator system-assisted means cutting the substantially continuous foil, wherein the step of cutting is performed between the disposing step and the urging step, or after the urging step.

In one embodiment of the fourth aspect, the automated applicator or applicator system-assisted means is the applicator or applicator system of any embodiment of the first aspect.

In one embodiment of the fourth aspect, the substantially continuous capping material is the substantially continuous capping material of any embodiment of the second aspect.

In one embodiment of the fourth aspect, the disposing step and/or the urging step and/or the cutting step is/are performed by the applicator or applicator system of any embodiment of the first aspect.

In one embodiment of the fourth aspect, the analytical sample vessel comprises a biological sample such as urine or a derivative thereof, or blood or a derivative thereof. In another embodiment of the fourth aspect, the analytical sample vessel comprises a non-clinical sample which may be environmental sample such as a water sample, a soil sample, a geological sample, or a botanical sample. Other applicable sample types include industrial process samples such as mining process samples, manufacturing process samples, samples of agricultural or environmental origin and the like.

In one embodiment of the fourth aspect, the biological sample has been previously contacted by an analytical apparatus. As will be appreciated, the present applicator or applicator system is particularly applicable for the resealing of analytical sample tubes that have been sampled a first time, and may be sampled a second time. The previous contact in this context is therefore contact of the sample with an analytical apparatus (such as a sampling needle of the analytical apparatus) in the course of the first analysis.

In a fifth aspect, the present invention provides a method of analysing a sample in an analytical sample tube, the method comprising the steps of: contacting a sample in an analytical tube with an analytical apparatus so as to withdraw a portion of the sample, and performing the method of any embodiment of the fourth aspect so as to provide a capped analytical sample tube containing the remainder of the sample, and storing the capped analytical sample tube under suitable conditions.

In one embodiment of the fifth aspect, the method comprises the steps of: withdrawing some or all of the remaining sample of the capped analytical sample tube, and performing an analysis on the some or all of the remaining sample withdrawn.

In a sixth aspect, the present invention provides a method of dividing a sample in a first sample vessel, the method comprising the steps of: withdrawing a portion of a sample from the first sample vessel and dispensing the withdrawn portion into a second sample vessel, and performing the method of any embodiment of the fourth aspect so as to provide a capped first sample vessel containing the remainder of the sample and/or a capped second sample vessel containing the withdrawn portion of the sample.

In one embodiment of the sixth aspect, the method comprises the step of storing the capped sample vessel under suitable conditions.

It will be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details.

In other instances, well-known methods, structures and techniques have not been shown in detail in order not to obscure an understanding of this description.

Thus, while there has been described what are believed to be the preferred embodiments of the invention, those skilled in the art will recognize that other and further modifications may be made thereto without departing from the spirit of the invention, and it is intended to claim all such changes and modifications as fall within the scope of the invention. Steps may be added or deleted to methods described within the scope of the present invention.

Although the invention has been described with reference to specific embodiments, it will be appreciated by those skilled in the art that the invention may be embodied in many other forms. The present invention will be now more fully described by reference to the following non-limiting preferred embodiments.

PREFERRED EMBODIMENTS OF THE INVENTION

It should be noted that the preferred embodiment discussed in this section is intended to detail a prototype apparatus capable of utilising a continuous foil roll to cap a sample tube. The embodiment of this section is essentially hand operated, and intended to cap one tube at a time. While clearly useful, modifications will be made to this embodiment in order to be operable in the context of a high throughput sample handling system. Given the benefit of the present specification, the skilled person is enabled to structurally and functionally integrate this embodiment into a high throughput sample handling system. For example, the holder of this embodiment would be replaced with the sample tube holder and transport means of a high throughput system, and furthermore coordinate the capping process with the movement and positioning of sample tubes.

Figure 1:
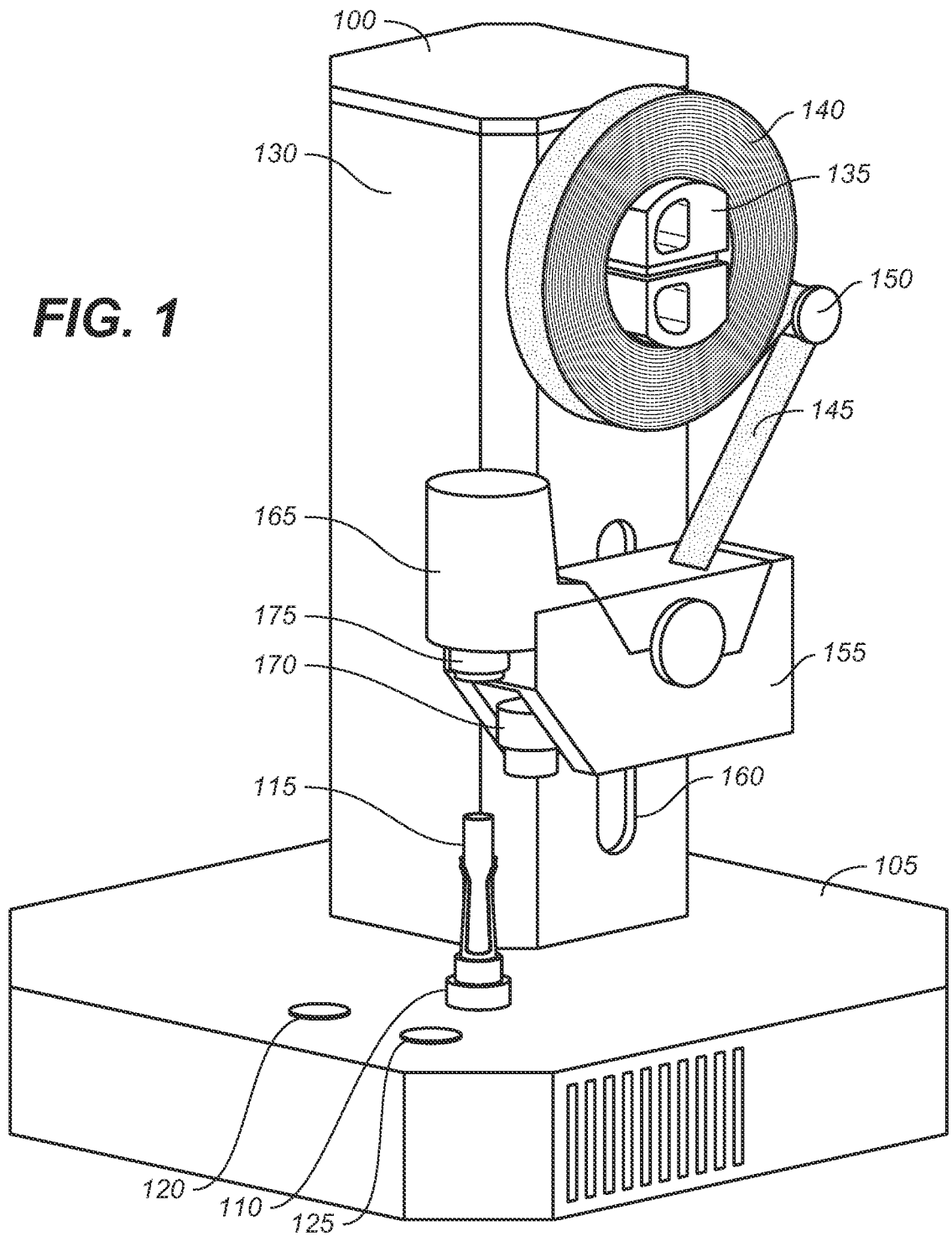
FIGS. 1 to 7 are photographs of a highly preferred applicator of the present invention executing, in sequential order, the capping of an analytical sample tube according to a highly preferred method.

Turning to FIG. 1 firstly, there is shown an applicator 100 of the invention, consisting broadly of a base 105 upon which a sample tube holder 110 is disposed, and in which a sample tube 115 is resident. The base also comprises user actuatable controls 120, 125. Extending upwardly from the base 105 is a tower 130 having at its upper end a rod 135. A roll of foil 140 is mounted on the rod 135. The applicator has an associated drag system for controlling the slack in the foil between the roll 140 and subsequent drive rollers. A length of foil 140 that has been drawn from the roll 140 is evident. The foil 145 exits the roll at a lower quadrant and traces upwardly over the guide roller 150, and then downwardly to enter the carriage 155.

The carriage 155 is slidable upwardly and downwardly along the track 160. The carriage comprises at the end proximal to the sample tube 115 a first crimp head 165 and disposed inferiorly and laterally thereto a second crimp head 170. The terminal end of the foil 140 exits the carriage 155 immediately inferior to the first crimper 165 at the point marked 175.

As will be described more fully infra, the foil 145 is drawn from the roll 140 by rollers (not shown) and in the carriage 155 such that the terminus of the foil 145 is located at point 175.

The operation of these components and other components will now be more fully described.

Figure 2:
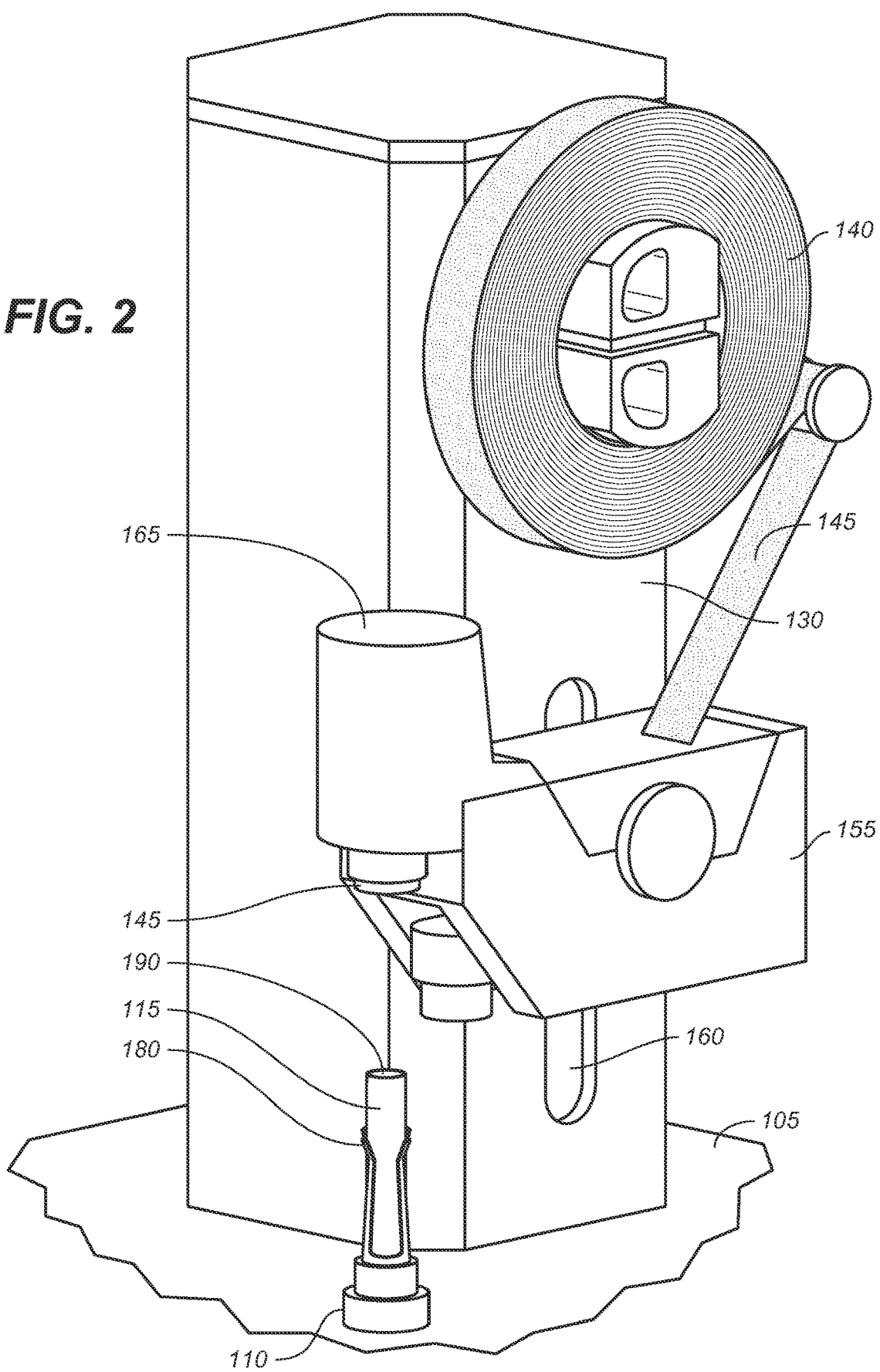

Reference is now made to FIG. 2 which shows the applicator in a starting configuration having an uncapped sample tube 115 disposed in the holder 110 awaiting capping. It will be noted from this figure that the holder 110 comprises upwardly extending lateral support members 180 which act to steady the sample tube 115. The terminus of the foil is shown at 145A, and as will be appreciated from this figure is disposed directly between the first crimp head 165 and sample tube opening 190.

Figure 3:
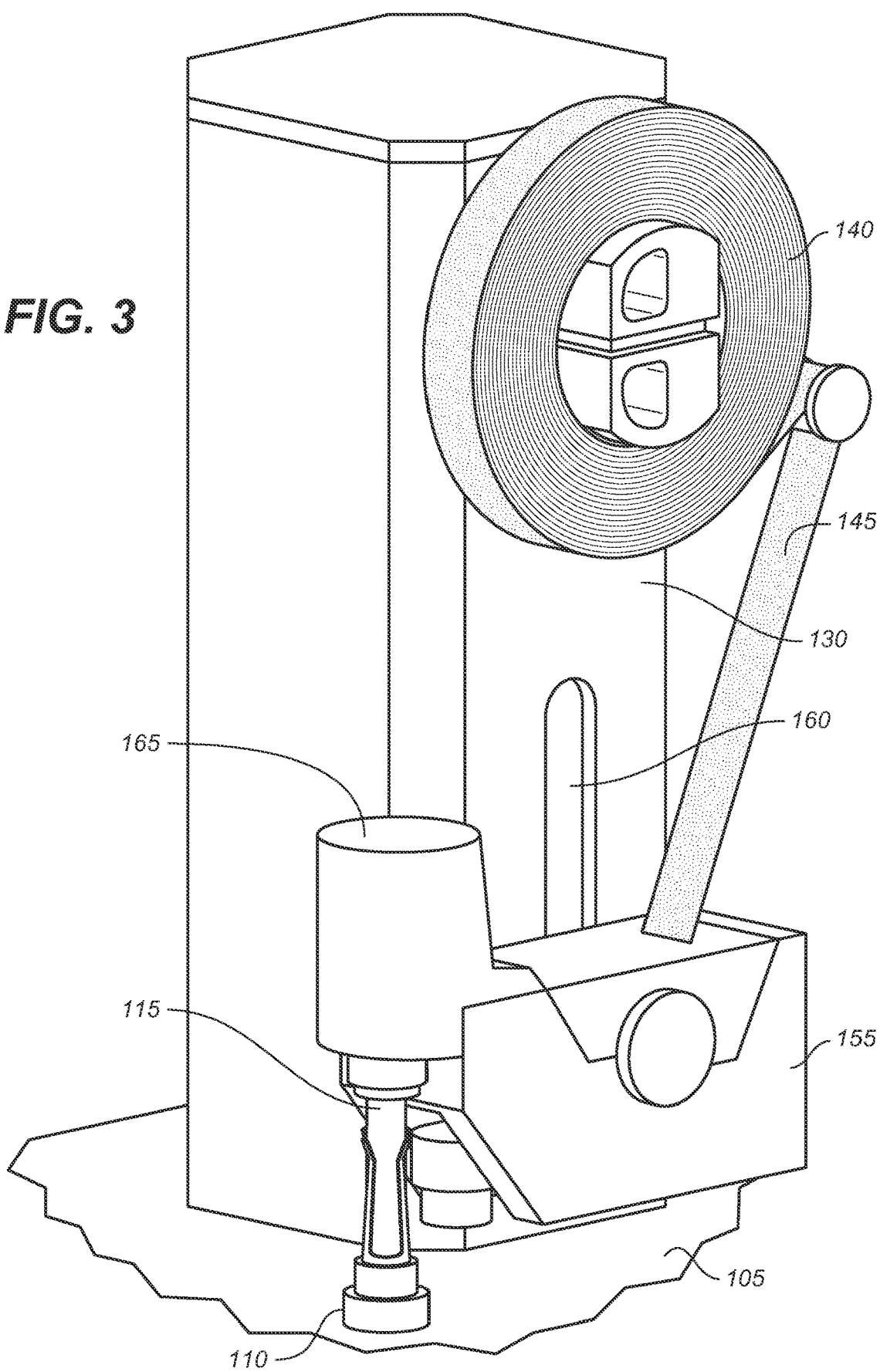

The user actuates the control 120 (FIG. 1), which causes a motor (not shown) to drive the carriage 155 downwardly, and as shown in FIG. 3 so as to lower the first crimping head 165 onto the sample tube 115. In the process of the carriage being lowered (and as will be more fully described infra) the carriage senses that the foil has been clamped against the tube opening, and the foil 145 is then cut to the right of the first crimping head 165 to form a cut foil portion sitting on the opening of the sample tube 115. The cut portion is formed, before the first crimping head 165 is at the fully lowered to the position shown in FIG. 3. After the cut foil portion is formed, the carriage 155 continues its downward movement, and in that process the first crimping head 165 deforms the cut foil portion about the sample tube 115 sides to form a loose crimp about the opening of the sample tube 190 in FIG. 3.

Figure 4:
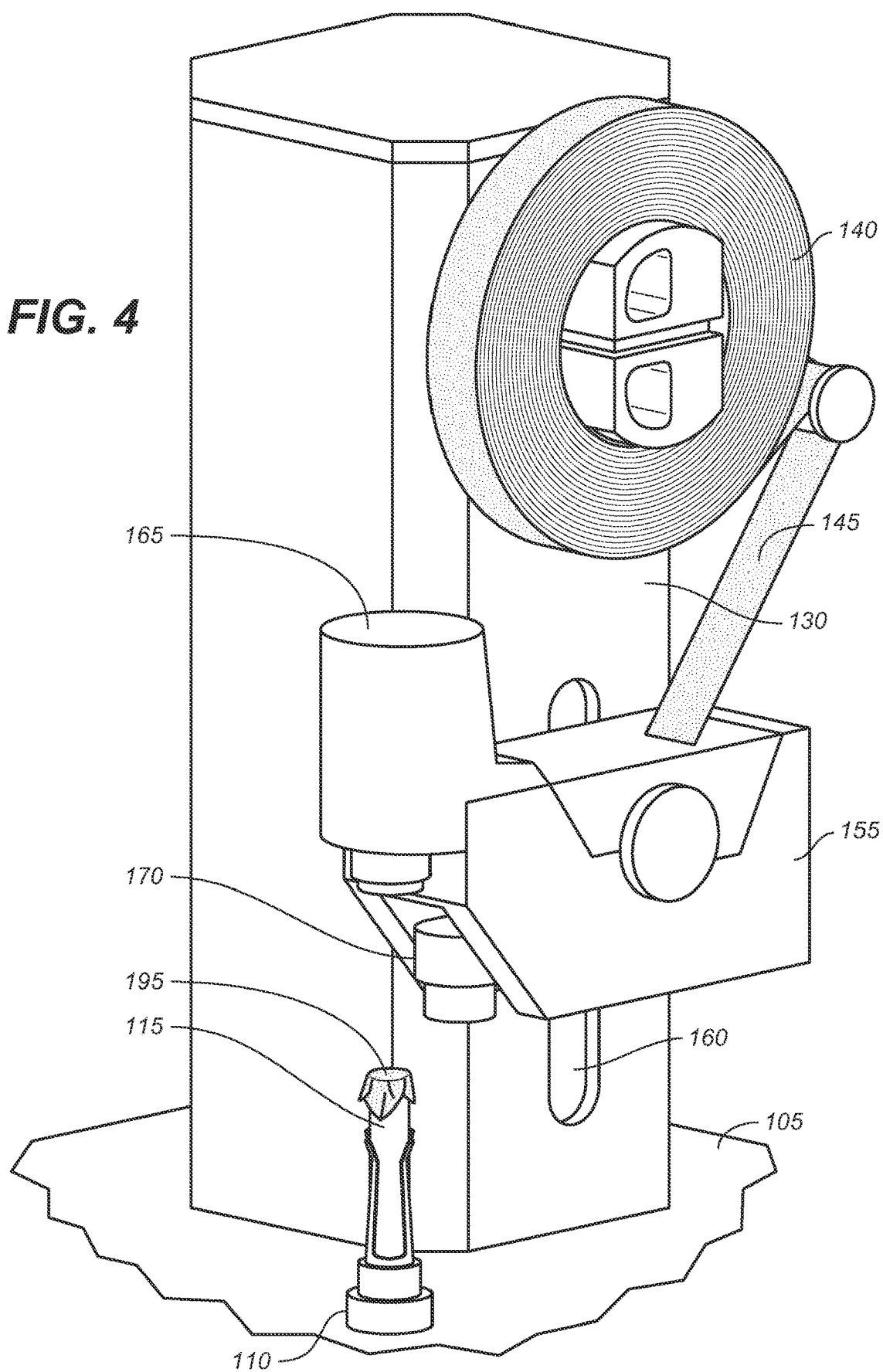

The carriage 155 then slides upwardly along the track 160 by action of a motor (not shown) such that the first crimping head 165 moves vertically away from the sample tube 115, as shown in FIG. 4. Attention is directed to the foil portion 195 which is now visible sitting on the sample tube 115. It will be noted that the foil portion 195 has been deformed by the first crimping head 165 such that the foil portion 195 so as to form a partially formed cap having only a very loose engagement with the sample tube 115. A heating element (not shown) in the first crimping head 165 is automatically activated so as to weld the opening edge of the sample tube 115 to the foil portion (not shown). This welding step occurs after the initial loose crimp, but before the carriage 155 slides upwardly.

Figure 5:
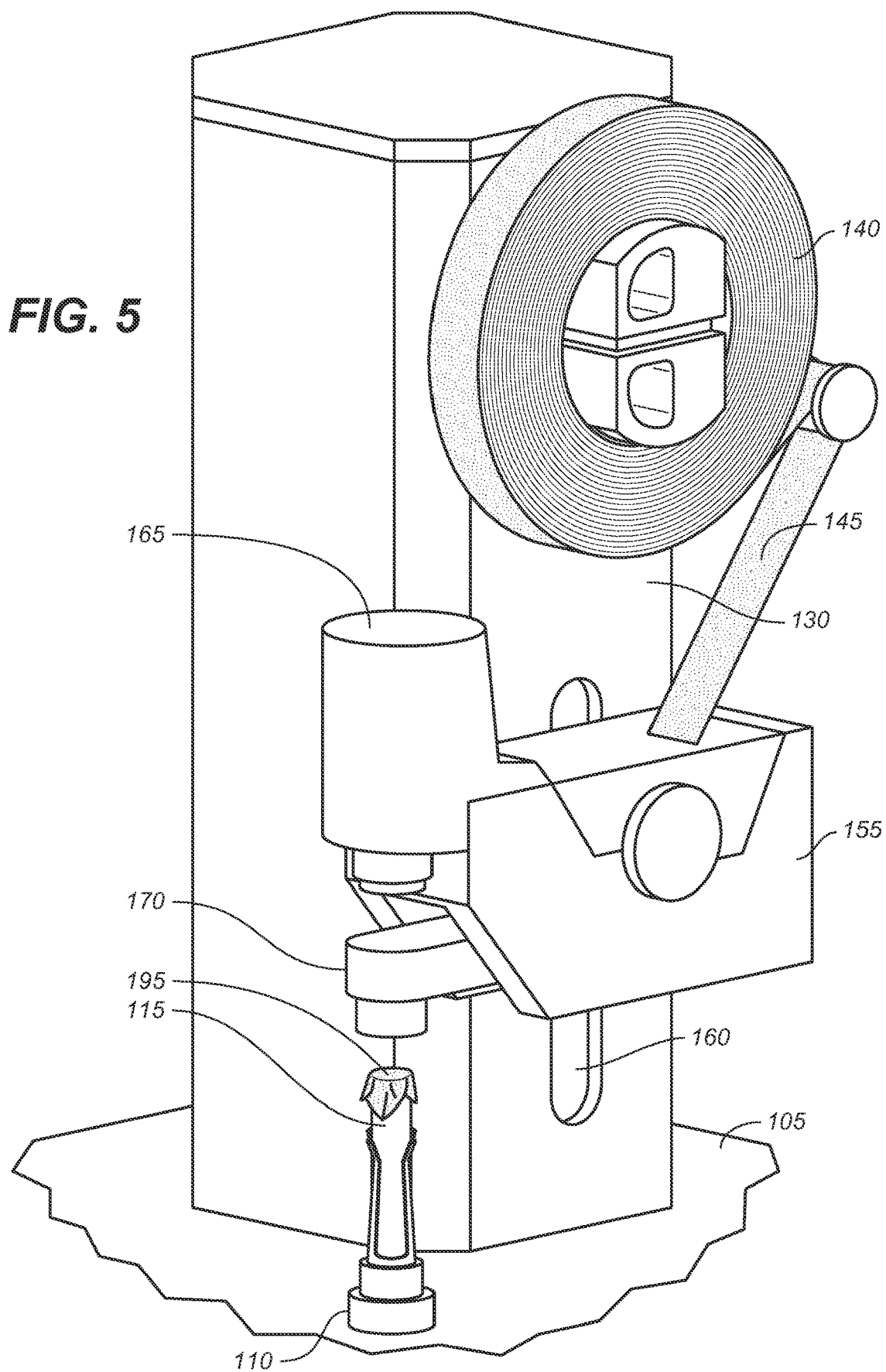
Figure 6:
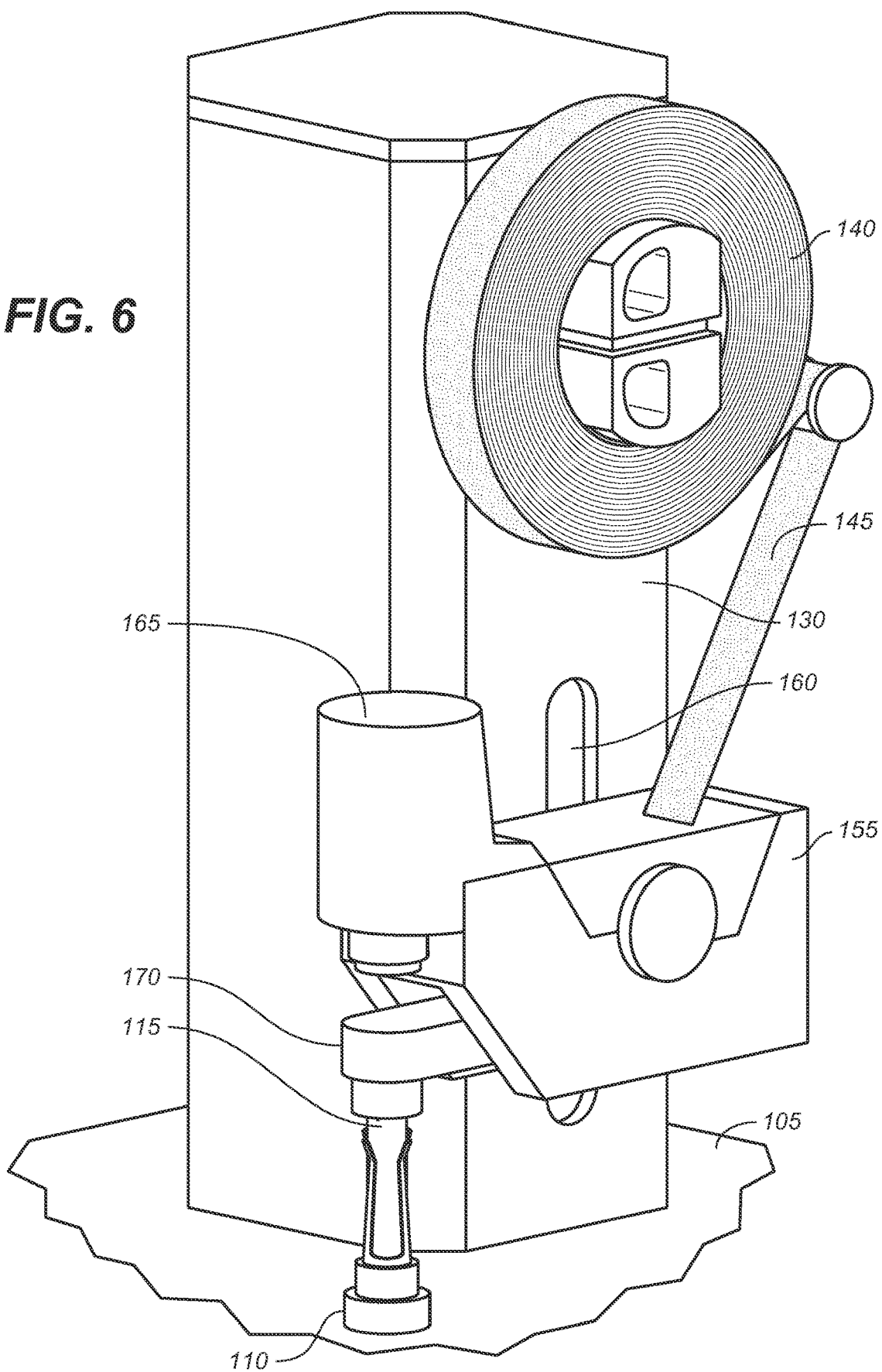

In the next step, the second crimping head 170 is extended so as to be directly superior to the tube 115, as shown in FIG. 5. The carriage 155 is then lowered to the position shown in FIG. 6 such that the second crimping head 170 is lowered onto the tube 115 and foil portion (not shown). The second crimping head is configured to more tightly form the foil portion (not shown) about the tube 115.

The first crimping step provides a snug crimp for tubes with a diameter range of only a few mm, say up to 3 mm difference, such as 15-18 mm in diameter. Some applications require capping of a broader range of tube diameters, for example from 12 mm to 18 mm. In this case the first crimping step only provides a snug crimp for the larger diameter tubes and the second crimping step is required to create a snug crimp on the smaller diameter tubes (the larger ones being skipped as they would not fit). A control system may inform the applicator what diameter tube is present for capping.

Figure 7:
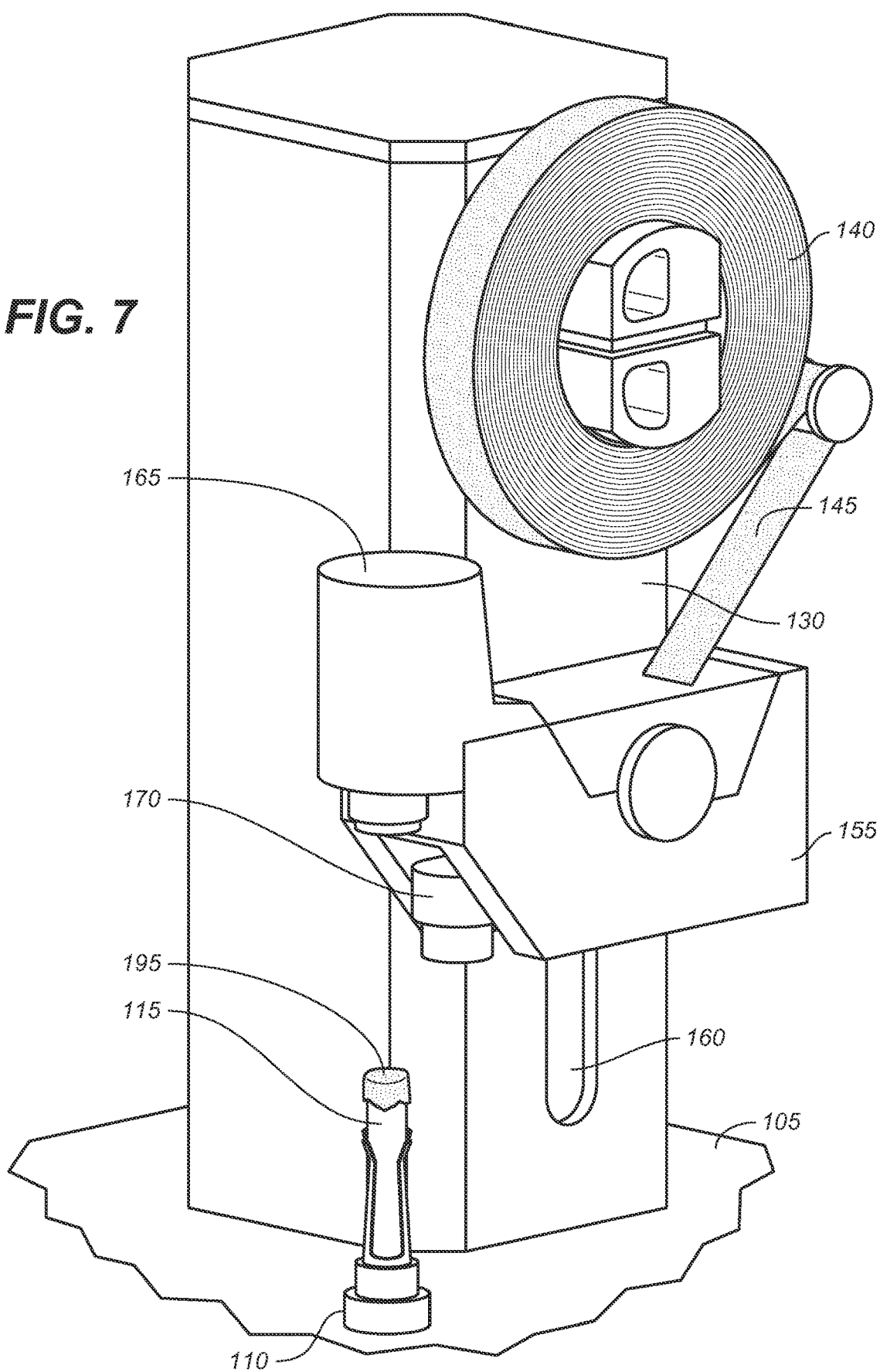

The final step is shown at FIG. 7, where the carriage 155 has been slid upwardly by motor means so as to leave the tube 115 and foil portion 195 free. The capped tube 115 may now be removed for storage, if required. It will be noted that the foil portion is now closely crimped around the tube 115, and welded thereto so as to form a stable cap. In some embodiments, the cap forms a water tight or air tight seal.

The use of a foil provides advantage in that the capped tube can be pieced by a sampling needle of an automated sample handling or analysis apparatus. Alternatively, the capped foil seal can be easily peeled from the top of the tube to get access to the sample inside the tube.

Figure 8:
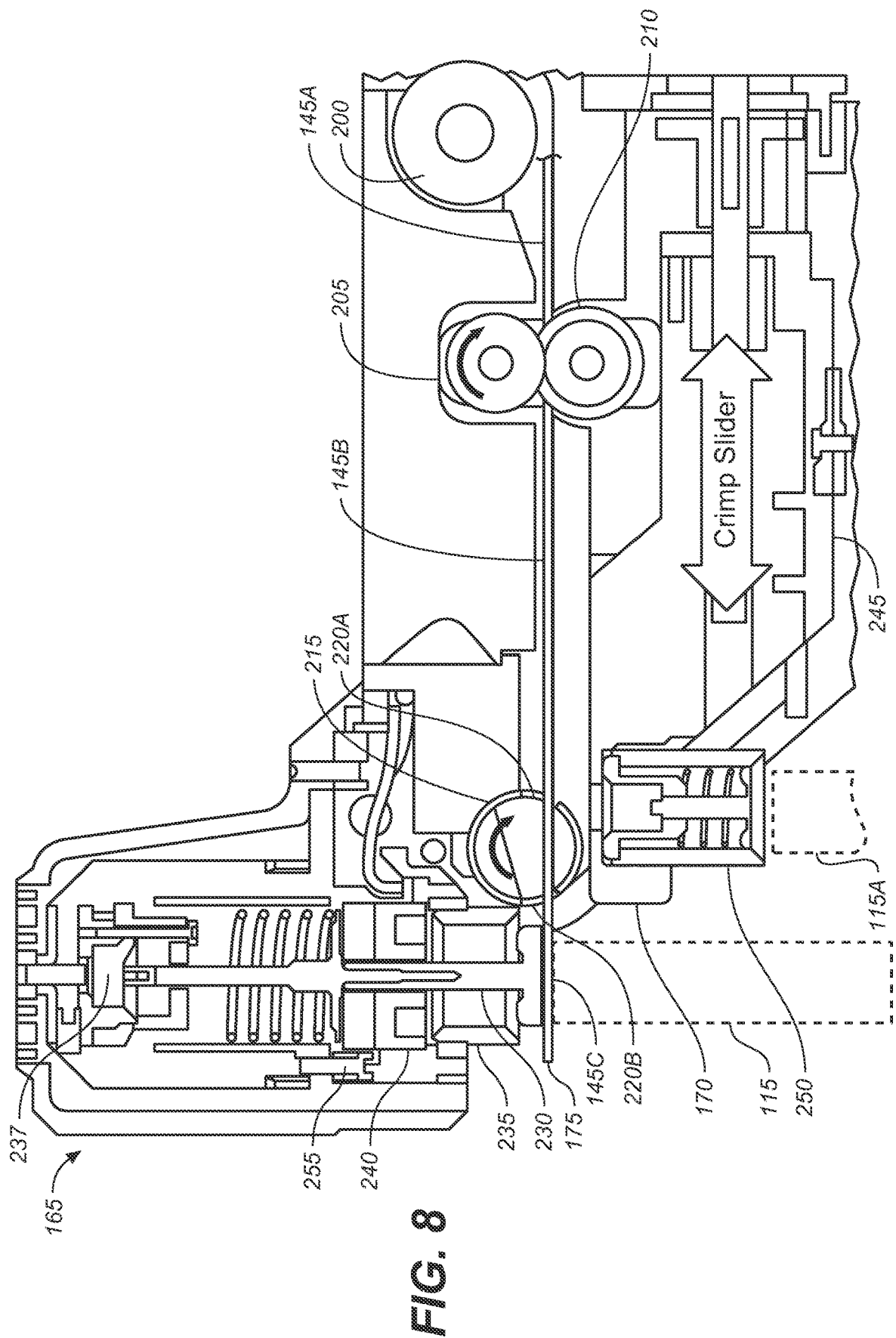
FIG. 8 is a diagrammatic representation in lateral view of the carriage component of the highly preferred applicator of FIGS. 1 to 7.

Further details of the structure and operation of the carriage 155 will now be provided, and in reference to FIG. 8. In FIG. 8, the state of the carriage 155 components and the foil 145 being transported through carriage is shown just prior to the first crimping head 165 being lowered onto the sample tube as per FIG. 1. It will be noted that the second crimping head 170 is in the withdrawn position (i.e. disposed to the right, as drawn).

The continuous length of foil 145 is pulled from the roll (marked 140 in FIGS. 1 to 7) and is guided by the roller (marked 150 in FIG. 1) so as to enter the carriage at 145A. The foil passes under carriage guide roller 200 and pulled into the carriage (from right to left, as drawn) by the motor driven roller 205 and pinch roller 210. The region of foil about 145B is supported and directed by a track (not shown).

Figure 9:
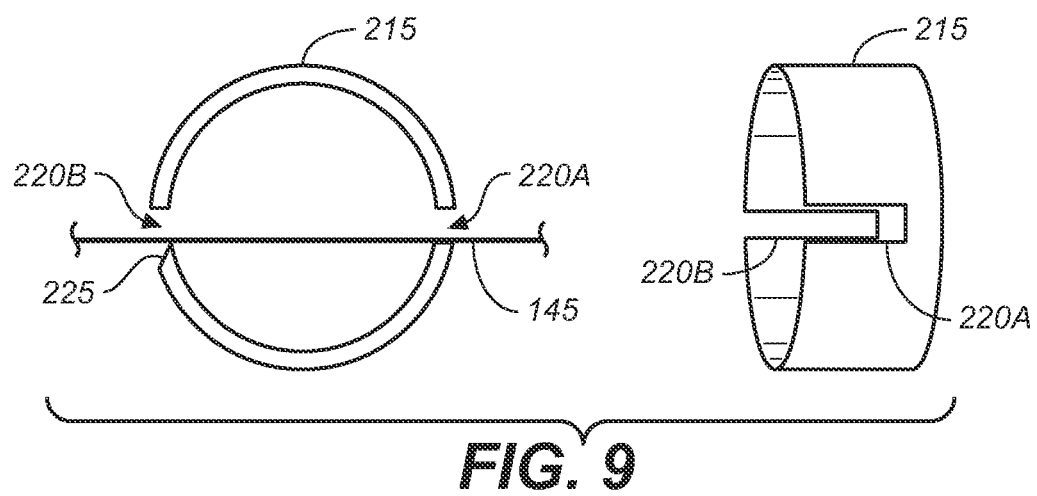
FIG. 9 shows diagrammatic representations of the cutter of the carriage shown in FIG. 8. The left-hand representation is of the cutter in end-on view and having a length of foil passing therethrough (consistent with the representation of FIG. 8). The right-hand representation is a perspective view of the cutter, although devoid of the foil so as to more clearly show the opposed notches.

The foil then passes through a circular cutter 215. The circular cutter 215 is essentially a short rigid tube having opposing notches 220A and 220B, as more clearly shown in FIG. 9. The foil 145 passes through the notches 220A and 220B, and is in fact supported by the upward facing edges of the notches 220A and 220B. At the required time, the circular cutter is rotated clockwise (as drawn) by a motor (not shown) resulting in shearing force being applied to the foil 145 by the specially angled lower edge 225 of the notch 220B. As will be clear from FIG. 8, the foil 145C is clamped between the downwardly biased plunger 230 and the upper edge of a sample tube 115 (drawn ghosted) such that the length of foil 145 passing over the notch edge 225 is held taught so as to facilitate the severing action of the cutter.

The state of the components and foil 145 within the carriage 155 are shown at FIG. 8 before cutting of the foil 145 has occurred, and the second crimping head is in the withdrawn position. In this state the carriage is lowered thereby lowering the first crimping head 165. The plunger 230 biased in the downward position (as drawn) so as to contact the underlying foil 145C. As the carriage 155 is lowered, the sample tube 115 underlying the foil 145C bears on the foil 145C, which in turns bears on the plunger 230. Movement of the plunger 230 relative to first crimping head 165 housing causes actuation of the plunger sensor switch 237, which in turn causes the motor driving the downward movement of the carriage to stop.

Once movement of the carriage is stopped, the foil cutter 215 is rotated clockwise (as drawn) so as to sever the foil at notch 220B so as to form a foil portion (as marked 195 in FIGS. 4, 5 and 7). At this point, the foil portion maintains its generally planar geometry and is retained in position by the downwardly biased plunger 230 clamping it against the lip of the opening of the sample tube 115.

Once the rotary action of the cutter 215 is complete, the carriage 155 is caused by its motor to continue its downward movement. This further movement causes the foil portion 195 and upper end of the tube 115 to move into the annular chamber 235 of the first crimping head 165, which in turn causes the foil portion 195 to be scrunched around the tube opening. The foil portion 195 is brought into proximity of the heating element 240, however does not make contact therewith. The foil portion 195 is heated either by induction (in which case the plunger 230 is non-metallic, this being case in this preferred embodiment) or by conduction (in which case the plunger 230 has a high heat transfer capability to transfer heat from the element 240 to the foil portion 195 when in contact with the element 240. The upper edge of the tube 115 with foil portion 195 eventually contacts heating element 240 (which in this preferred embodiment is an electrically powered induction coil) which forms the ceiling of the annular chamber 230. The heating element 240 is actuated so as to weld the foil portion 195 to the edge of the opening of the sample tube 115.

The carriage 155 is then moved by its motor upwardly along the track 160 so at to achieve the position shown in FIG. 5.

The following components and methods of operation are optional with regard to this preferred embodiment.

Tighter crimping of the foil portion 195 is achieved by application of the seconding crimping head 170 to the upper end of the sample tube 115 and the foil portion. At this point, no further foil 145 has been pulled into the carriage 155 (due to the lack of rotation of driven roller 205) to replace the foil portion 195 just applied to the tube 115.

The second crimping head 170 is mounted on a laterally slidable arm 245 acted upon by a linear actuator (not shown). The linear actuator extends the second crimping head 170 to the left (as drawn) such that the annular chamber 250 of the second crimping head 150 is coaxial with the underlying tube 115A (drawn ghosted). The carriage 155 is then moved downwardly by its motor such that the upper end of the tube 115A with welded foil portion 195 is moved into the annular chamber 250 of the second crimping head 170. The annular chamber 250 of the second crimping head 170 is of smaller diameter than the annular chamber 235 of the first crimping head 165, the smaller diameter resulting in a tighter crimping about the tube 115A (as shown in FIG. 7).

The carriage is then moved upwardly by its motor so as to clear the tube 115A, and the laterally slidable arm 245 being actuated so as to withdraw the second crimping head 170 into the carriage 155 housing. During these movements, the driven roller 205 is rotated clockwise (as drawn) so as to pull into the carriage a further length of foil 145 so as to replace the foil portion 195 just applied to the sample tube 115. The cutter 215 is in the position shown in FIG. 8, and so the foil 145 is moved through the opposing notches (right to left, as drawn) so as to lie inferior to the plunger 230 of the first crimping head 165. The driven roller 205 is driven until a predetermined length of foil 145 extends to the left (as drawn) of the extreme left (as drawn) of the sample tube 115. Detection of that condition is by way of foil sensor 255 which is disposed in the first crimping head 165 and disposed directly superior to the edge of the foil (marked 175). Once the foil edge has been extended to the position shown in FIG. 8 rotation of the driven roller 205 is stopped. The foil sensor 255 emits either red or IR light and detects a reflection from the foil (if present).

As will be appreciated form the above, many actions of the sequence outlined above are controlled automatically. As is within the capacity of the skilled person, a microcontroller or other processor-based device may be implemented to effect such automatic control. Any or all electric motor(s) which drive the carriage 155 movement upwardly and downwardly, or rotate the driven roller 205, or rotate the cutter 215, or any actuator which moves the arm 245 may be controlled by the microcontroller. The same microcontroller may be charged with supplying (or not supplying) current to the heating element 240. The microcontroller may receive input signals (analogue or digital) from any one or more of the plunger sensor switch 237, or the foil sensor 255, or any position sensor and to utilize that input in a decision-making algorithm executed by the microcontroller to control any electrically or electronically controllable component the applicator such as any of the aforementioned motor, heating elements or actuators.

As will be apparent from the above, the present invention may involve the use of processors, (including microprocessors), software executable on such devices and the like to control one or more motors and/or to received sensor data and/or to process sensed data. Some methods may be computer executable. Moreover, systems may be required to interconnect components such as processors, motors, sensors and the like.

Application software may be used to control one or more motors and/or to receive sensor data and/or to process sensed data. Such software useful in the context of the present invention may be executable on any past, present or future operating system of a processor-enabled device including Windows™, Linux™ and the like. Alternatively, machine level instructions may be implemented.

The applicator or applicator system, methods and systems described herein may comprise or be deployed in part or in whole through one or more processors that execute computer software, program codes, and/or instructions on a processor. A processor may be any kind of computational or processing device capable of executing program instructions, codes, binary instructions and the like. The processor may be or may include a signal processor, digital processor, embedded processor, microprocessor or any variant such as a coprocessor (math co-processor, graphic co-processor, communication co-processor and the like) and the like that may directly or indirectly facilitate execution of program code or program instructions stored thereon. In addition, the processor may enable execution of multiple programs, threads, and codes.

The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere.

Any processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The applicator or applicator system, methods and systems described herein may comprise or be deployed in part or in whole through one or more computers that execute software. The computer may include one or more of memories, processors, computer readable media, storage media, ports (physical and virtual), communication devices, and interfaces capable of accessing other computers, and devices through a wired or a wireless medium, and the like. The methods, programs or codes as described herein and elsewhere may be executed by the computer. In addition, other devices required for execution of methods as described herein.

The computer software, program codes, and/or instructions may be stored and/or accessed on computer readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks. Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The applicator or applicator system, methods and systems described herein may transform physical and/or or intangible items from one state to another. The methods and systems described herein may also transform data representing physical and/or intangible items from one state to another.

The methods and/or systems useful in the present invention may be realized in hardware, software or any combination of hardware and software suitable for a particular application. The hardware may include a general purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a computer readable medium.

The Application software may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, a method of the present invention may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

The invention may be embodied in program instruction set executable on one or more computers. Such instructions sets may include any one or more of the following instruction types:

Data handling and memory operations, which may include an instruction to set a register to a fixed constant value, or copy data from a memory location to a register, or vice-versa, to store the contents of a register, result of a computation, or to retrieve stored data to perform a computation on it later, or to read and write data from hardware devices.

Arithmetic and logic operations, which may include an instruction to add, subtract, multiply, or divide the values of two registers, placing the result in a register, possibly setting one or more condition codes in a status register, to perform bitwise operations, e.g., taking the conjunction and disjunction of corresponding bits in a pair of registers, taking the negation of each bit in a register, or to compare two values in registers (for example, to see if one is less, or if they are equal).

Control flow operations, which may include an instruction to branch to another location in the program and execute instructions there, conditionally branch to another location if a certain condition holds, indirectly branch to another location, or call another block of code, while saving the location of the next instruction as a point to return to.

Coprocessor instructions, which may include an instruction to load/store data to and from a coprocessor, or exchanging with CPU registers, or perform coprocessor operations.

A processor of a computer of the present system may include "complex" instructions in their instruction set. A single "complex" instruction does something that may take many instructions on other computers. Such instructions are typified by instructions that take multiple steps, control multiple functional units, or otherwise appear on a larger scale than the bulk of simple instructions implemented by the given processor. Some examples of "complex" instructions include: saving many registers on the stack at once, moving large blocks of memory, complicated integer and floating-point arithmetic (sine, cosine, square root, etc.), SIMD instructions, a single instruction performing an operation on many values in parallel, performing an atomic test-and-set instruction or other read-modify-write atomic instruction, and instructions that perform ALU operations with an operand from memory rather than a register.

An instruction may be defined according to its parts. According to more traditional architectures, an instruction includes an opcode that specifies the operation to perform, such as add contents of memory to register—and zero or more operand specifiers, which may specify registers, memory locations, or literal data. The operand specifiers may have addressing modes determining their meaning or may be in fixed fields. In very long instruction word (VLIW) architectures, which include many microcode architectures, multiple simultaneous opcodes and operands are specified in a single instruction.

Some types of instruction sets do not have an opcode field (such as Transport Triggered Architectures (TTA) or the Forth virtual machine), only operand(s). Other unusual "0-operand" instruction sets lack any operand specifier fields, such as some stack machines including NOSC.

Conditional instructions often have a predicate field—several bits that encode the specific condition to cause the operation to be performed rather than not performed. For example, a conditional branch instruction will be executed, and the branch taken, if the condition is true, so that execution proceeds to a different part of the program, and not executed, and the branch not taken, if the condition is false, so that execution continues sequentially. Some instruction sets also have conditional moves, so that the move will be executed, and the data stored in the target location, if the condition is true, and not executed, and the target location not modified, if the condition is false. Similarly, IBM z/Architecture has a conditional store. A few instruction sets include a predicate field in every instruction; this is called branch predication.

The instructions constituting a program may be specified using their internal, numeric form (machine code); they may be specified using an assembly language or, more typically, may be generated from programming languages by compilers.

The invention claimed is:

1. An applicator or applicator system for applying a capping material to an opening of an analytical sample vessel, the applicator or applicator system comprising:
   (a) a dispenser configured to dispense a substantially continuous length of the capping material, such that a region of the substantially continuous length of the capping material is located on or about an opening of an analytical sample vessel held in a predetermined orientation;
   (b) a capping material locking element configured to clamp the capping material against the analytical sample vessel, and later unlock to release the capping material; and
   (c) a cutter configured to cut the capping material adjacent to the analytical sample vessel and having a position to cut the substantially continuous length of the capping material while the capping material is clamped against the analytical sample vessel by the capping material locking element.

2. The applicator or applicator system of claim 1 comprising a holder configured to hold the analytical sample vessel in the predetermined orientation, the holder and dispenser in relative spatial arrangement, or configured to be movable into relative spatial arrangement such that, in use, the region of the capping material dispensed by the dispenser is positionable on or about the opening of the analytical sample vessel held by the holder.

3. The applicator or applicator system of claim 2, wherein the holder is separate to the dispenser.

4. The applicator or applicator system of claim 2, wherein the holder is configured to hold the analytical sample vessel having an opening such that when in the predetermined orientation and when uncapped, contents of the analytical sample vessel remain therein.

5. The applicator or applicator system of claim 2, wherein the holder is configured to releasably engage with a base region and/or a side of the analytical sample vessel, or a support for one or a plurality of sample vessels.

6. The applicator or applicator system of claim 1, wherein the analytical sample vessel is a multiwell plate.

7. The applicator or applicator system of claim 2, wherein the holder is configured to move the analytical sample vessel from a first position in which the applicator or applicator system is incapable of capping the analytical sample vessel with the capping material dispensed by the dispenser, to a second position in which the applicator or applicator system is capable of capping the analytical sample vessel with the capping material dispensed by the dispenser.

8. The applicator or applicator system of claim 2, wherein the dispenser is arranged to feed the region of the substantially continuous length of the capping material toward the opening of the analytical sample vessel held by the holder in a position in which the applicator or applicator system is capable of capping the analytical sample vessel with the capping material dispensed by the dispenser.

9. The applicator or applicator system of claim 1, wherein the dispenser is configured to releasably engage with a roll configured to hold and release the substantially continuous length of the capping material.

10. The applicator or applicator system of claim 9, wherein the dispenser comprises a rotatable or rotating member configured to releasably engage with the roll configured to hold the substantially continuous length of the capping material.

11. The applicator or applicator system of claim 2 comprising a capping material transport system configured to transport the region of the substantially continuous length of the capping material dispensed by the dispenser from the dispenser and to a position in which the applicator or applicator system is capable of capping the analytical sample vessel held by the holder.

12. The applicator or applicator system of claim 1 comprising a capping material crimper configured to crimp the capping material dispensed by the dispenser onto the analytical sample vessel.

13. The applicator or applicator system of claim 1 wherein the cutter is configured to cut free a terminal portion of the capping material dispensed by the dispenser.

14. The applicator or applicator system of claim 13 comprising capping material urging means, wherein the cutter is disposed downstream from the capping material urging means and the dispenser.

15. The applicator or applicator system of claim 1, wherein the capping material is a substantially continuous material capable of capping the analytical sample vessel, the capping material being elongate.

16. The applicator or applicator system of claim 1 wherein the capping material is in the form of a foil roll or a polymeric film roll.

17. A method comprising:
   providing an applicator or applicator system for applying a capping material to an opening of an analytical sample vessel, the applicator or applicator system comprising:
      (a) a dispenser configured to dispense a substantially continuous length of the capping material, such that a region of the substantially continuous length of the capping material is located on or about an opening of the analytical sample vessel held in a predetermined orientation,
      (b) a capping material locking element configured to clamp the capping material against the analytical sample vessel, and later unlock to release the capping material, and
      (c) a cutter configured to cut the capping material adjacent to the analytical sample vessel providing the analytical sample vessel having an opening and a sample disposed therein,
   the applicator or applicator system disposing the region of the substantially continuous length of the capping material onto and/or about the opening of the analytical sample vessel, comprising:
   the applicator or applicator system urging the region of the substantially continuous length of the capping material onto and/or about the opening of the analytical sample vessel, and
   the capping material locking element clamping the capping material against the analytical sample vessel,
   the cutter cutting the substantially continuous length of the capping material,
   wherein the act of cutting is performed after the clamping act.

18. The method of claim 17, further comprising:
   analysing the sample in the analytical sample vessel, which comprises an analytical sample tube by:
   contacting the sample in the analytical sample tube with an analytical apparatus so as to withdraw a portion of the sample, and performing the acts of claim 17 so as to provide a capped analytical sample tube containing the remainder of the sample, and storing the capped analytical sample tube under suitable conditions.

19. The method of claim 17, further comprising:

dividing the sample in a first sample vessel, comprising:

withdrawing a portion of the sample from the first sample vessel and dispensing the withdrawn portion into a second sample vessel, and performing the acts of claim 17, the analytical sample vessel being the first sample vessel or the second sample vessel so as to provide a capped first sample vessel containing the remainder of the sample and/or a capped second sample vessel containing the withdrawn portion of the sample.

* * * * *